United States Patent

Herbert

Patent Number: 5,891,571
Date of Patent: Apr. 6, 1999

[54] FIRE-RESISTANT PVC FORMULATION

[75] Inventor: Mandy Jayne Herbert, George Green, United Kingdom

[73] Assignee: Alcan International Limited, Montreal, Canada

[21] Appl. No.: 781,692

[22] Filed: Jan. 10, 1997

[51] Int. Cl.[6] ............ B32B 15/00; D02G 3/00; H01B 7/00; C08K 3/18

[52] U.S. Cl. ............ 428/379; 428/372; 428/375; 428/389; 524/409; 524/406; 524/432; 524/437; 174/110 A; 174/110 SR; 174/110 V; 174/120 SR; 174/121 A

[58] Field of Search ................ 428/375, 372, 428/379, 389; 524/409, 437, 432, 406; 174/120 SR, 110 V, 110 SR, 121 A, 110 A

[56] References Cited

U.S. PATENT DOCUMENTS

| | | |
|---|---|---|
| 3,903,045 | 9/1975 | ChandraseKaran et al. . |
| 3,926,883 | 12/1975 | Touval . |
| 4,154,892 | 5/1979 | Glatti et al. . |
| 5,059,651 | 10/1991 | Ueno . |
| 5,227,417 | 7/1993 | Kroushl, III . |
| 5,324,588 | 6/1994 | Rinehart et al. . |
| 5,342,874 | 8/1994 | Chaplin et al. . |
| 5,356,710 | 10/1994 | Rinehart . |
| 5,698,323 | 12/1997 | Keough et al. . |
| 5,760,115 | 6/1998 | Okisaki et al. . |

Primary Examiner—William Krynski
Assistant Examiner—J. M. Gray
Attorney, Agent, or Firm—Cooper & Dunham LLP

[57] ABSTRACT

A fire-resistant polyvinyl chloride (PVC) formulation suitable for use as sheathing on electric wires and cables, contains 15–60 parts by weight per 100 parts by weight of PVC (phr) of a phosphate plasticize, 10–40 phr of a halogenated plasticize, 15–60 phr of aluminium trihydroxide, together with 5–20 phr of an additive combination of 10–90 wt% ofr antimony trioxide and 90–10 wt% of zinc stannate.

12 Claims, 6 Drawing Sheets

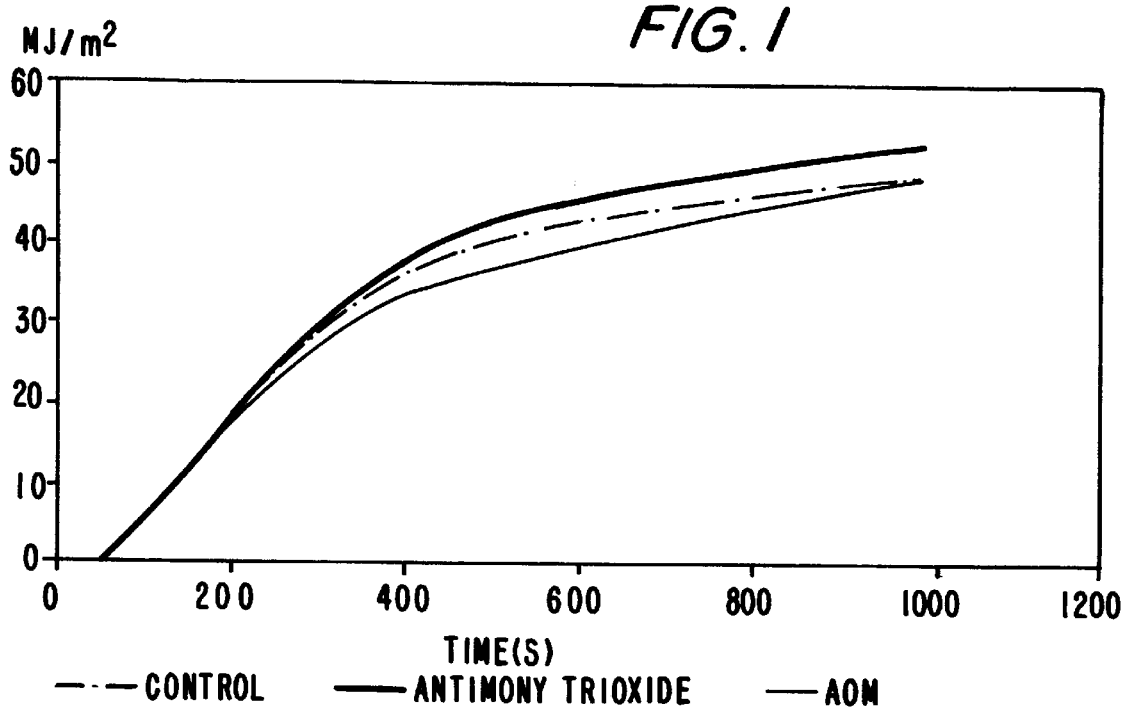
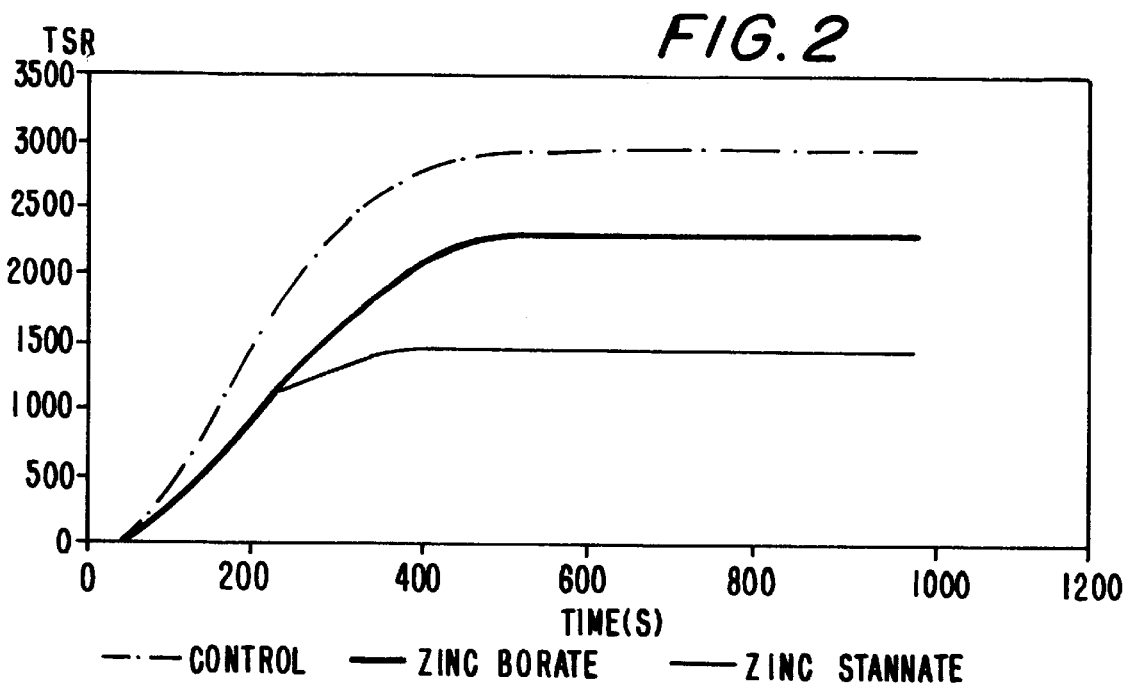

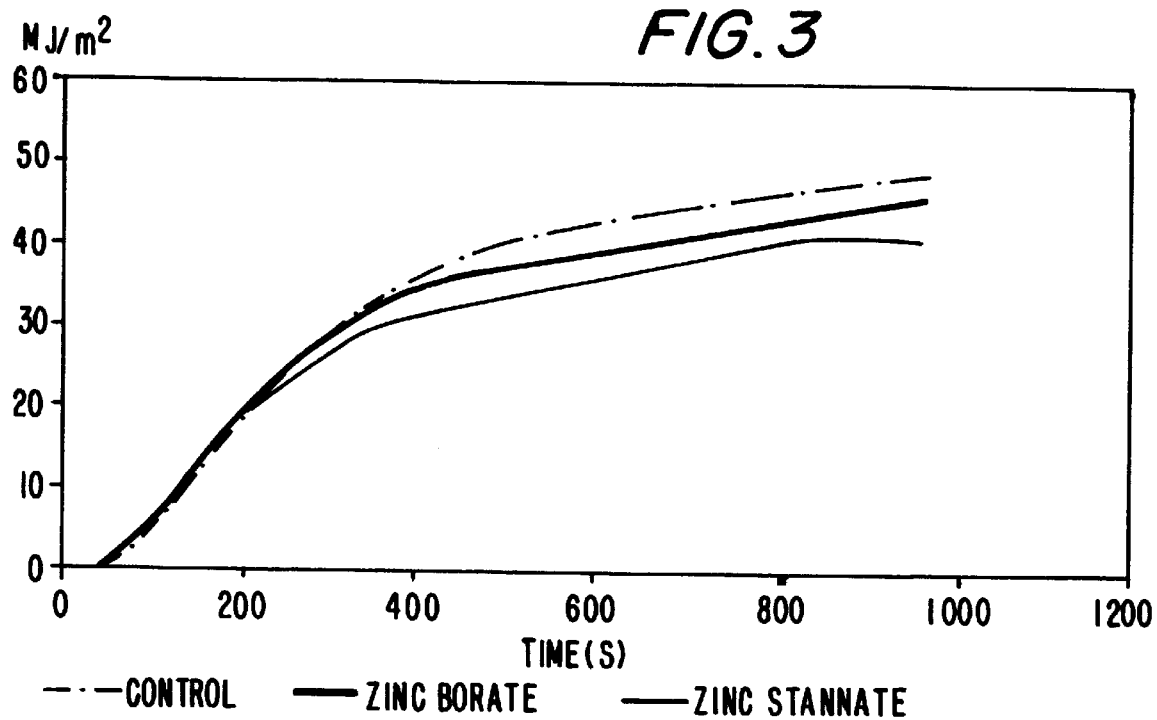
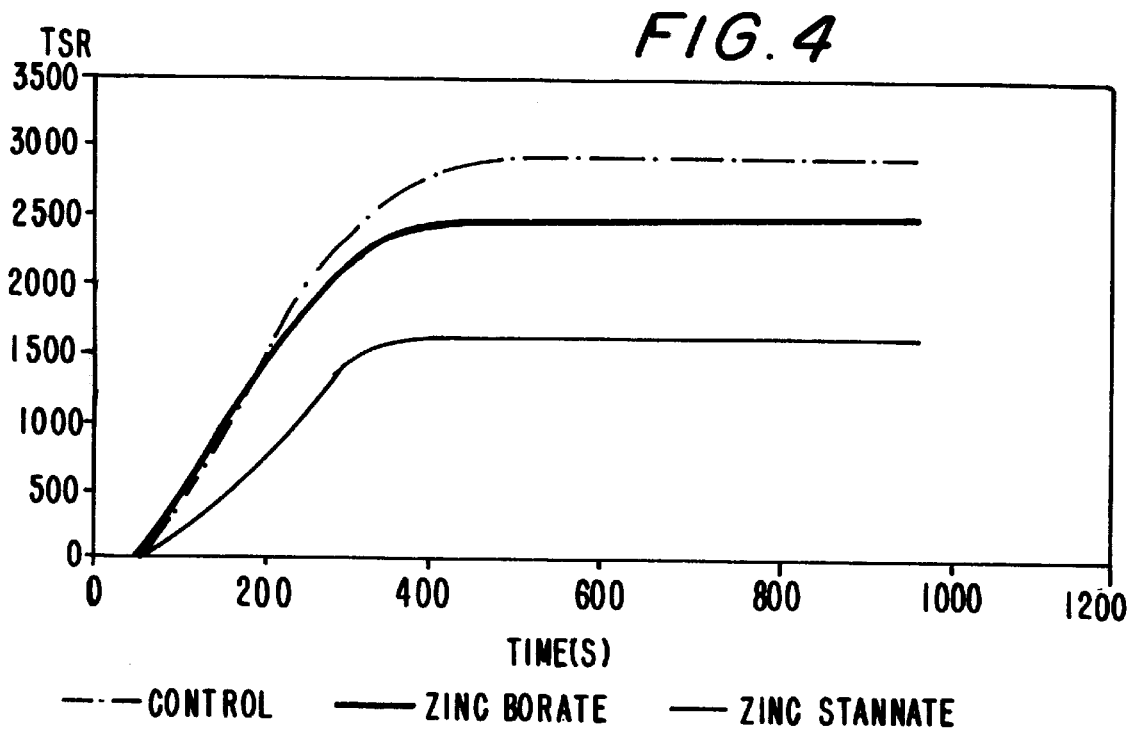

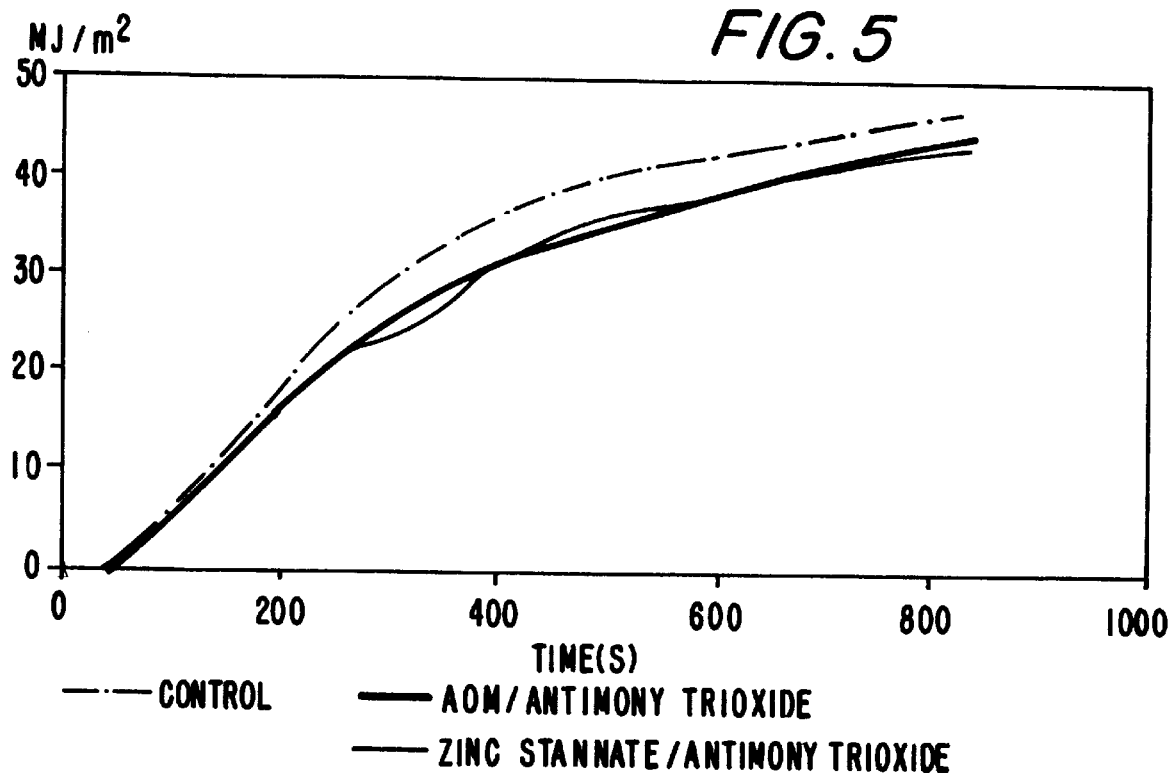
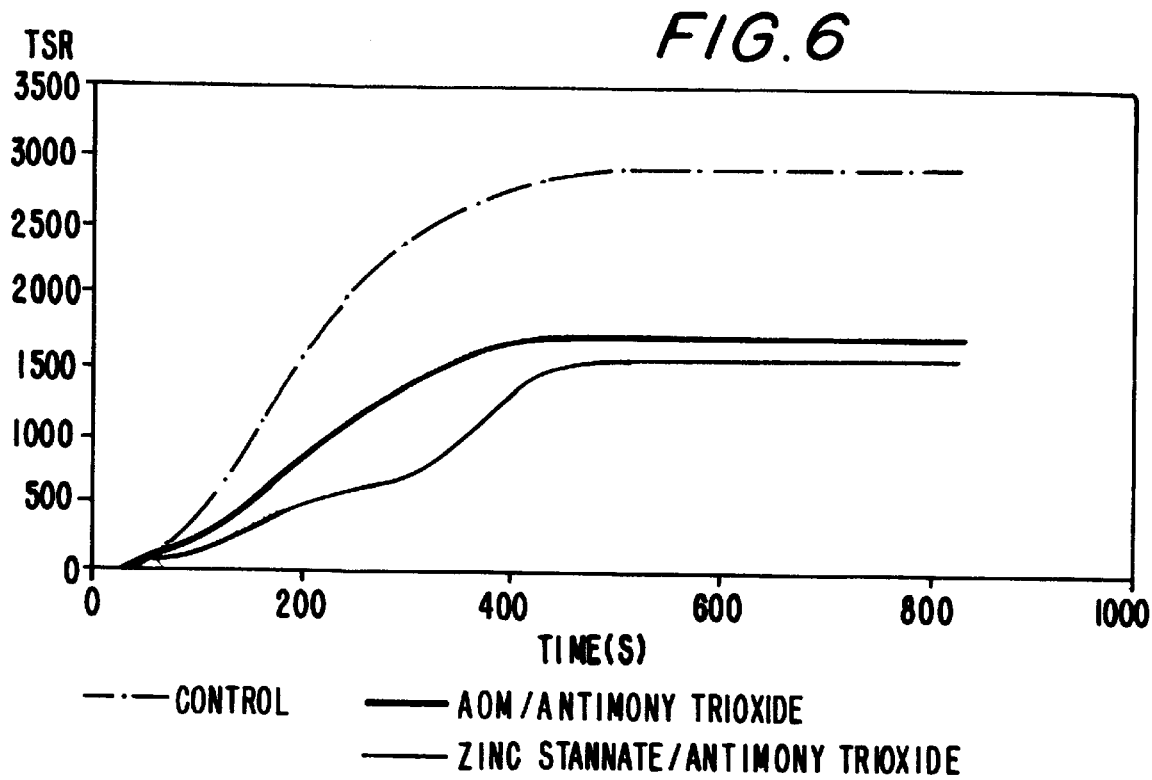

FIRE-RESISTANT PVC FORMULATION

INTRODUCTION

Flexible polyvinyl chloride (PVC) has been the material of choice for cable sheathing for many years[1]. PVC has excellent mechanical and electrical properties, and as the most polar of the commodity thermoplastics it readily tolerates a wide range of additives. Flame retardant PVC has been well documented and traditionally includes additives such as antimony trioxide. Flame retardancy can also be improved by replacing phthalate plasticisers with less flammable chlorinated waxes or phosphate esters. The main disadvantages with PVC are secondary fire characteristics, in particular smoke and corrosive acid gas emission.

PVC cables have to meet very severe standards. UL 910 is the most demanding cable test in North America. It measures flame propagation and smoke evolution. PVC plenum cables often do not have a problem meeting the flame spread requirements of UL 910. Conversely, cables based on polyolefins usually meet the smoke requirement but have problems with flame spread.

A common formulation for these cables is fluoropolymer insulation (notably FEP) with PVC sheathing. These high performance PVC sheathing formulations contain a number of flame retardant and smoke suppressant additives, notably brominated/chlorinated and phosphate plasticisers, and aluminium trihydroxide (ATH). Antimony trioxide is also used as a flame retardant additive, although it has little effect on the smoke evolution of PVC during combustion. Indeed its addition in many systems actually increases smoke output. For this reason, smoke suppressants such as ammonium octamolybdate are sometimes added.

A programme of work has been carried out in highly flame retardant flexible PVC using a formulation based broadly on the published literature [1,2,3] in order to obtain a system which gives low heat release rates and low smoke. This control formulation contains bromine phosphate and aluminium trihydroxide in addition, of course, to chlorine in the polymer backbone. The objective of this study was to observe the effect of the addition of further flame retardants and smoke suppressants including antimony trioxide, ammonium octamolybdate, zinc borate and zinc stannate on their own and in combinations. The results of the study, which form the basis of this invention, are applicable to polymer systems in general where halogen is present, in a polymer and/or in an additive.

THE INVENTION

The invention provides a formulation comprising at least one polymer and at least one fire-resistant additive, halogen being present in the polymer and/or the additive, wherein there is present from 5 to 20 parts by weight, per hundred parts by weight of polymer, of a mixture of from 10–90 wt % of an antimony compound and from 90–10 wt % of a divalent metal stannate.

Herein all parts and percentages are by weight unless otherwise stated. The term "phr" or per hundred of resin, is used to indicate parts by weight per hundred parts of polymer. Preferably the polymer is PVC.

Although the combination of the antimony compound and the divalent metal stannate acts synergistically to reduce total heat and total smoke and rate of smoke production, the PVC or other polymer formulations of this invention are fire-resistant by virtue of containing also at least one other fire resistant additive. Preferably PVC formulations according to this invention consist essentially of PVC together with 40–160 phr of at least one fire-resistant additive, 3–15 phr of at least one stabiliser, and 0.1–5 phr of at least one process aid.

The fire resistant additive may include one or more of: phosphate plasticisers; halogenated plasticisers; aluminium trihydroxide; hydroxides and carbonates and intermediate compounds of magnesium and calcium including Huntite and hydromagnesite; tin compounds such as divalent metal (eg Ca, Sr, Ba, Mg and Zn) stannates and hydroxystannates; antimony compounds such as antimony trioxide and antimony pentoxide; and molybdenum compounds such as molybdenum trioxide and molybdates.

Preferably the fire resistant additive comprises 15–60 phr of at least one phosphate plasticiser, 10–40 phr of at least one halogenated (generally brominated or chlorinated) plasticiser such as a brominated aromatic ester, and 15–60 phr of aluminium trihydroxide. Preferably the formulation also contains 1–20 phr of a molybdenum compound as a smoke suppressant. As noted in the experimental section below, ammonium octamolybdate acts synergistically with the antimony trioxide/zinc stannate combination of the invention. Thus the formulation preferably contains 1–9 phr of an antimony compound such as antimony trioxide, 1–9 phr of a divalent metal stannate such as zinc stannate and 1–9 phr of a molybdenum compound such as ammonium octamolybdate.

The PVC formulations are particularly suitable for use as sheathing for wires and cables. These include plenum cable and rising cable, in which one or more current carriers is surrounded by insulation and the whole is surrounded by PVC sheathing; electric wires in which one or more current carriers are surrounded by the PVC formulation which acts as both insulation and protective sheathing; and optical fibres.

DRAWINGS

FIGS. 1, 3 and 5 are graphs of total heat released against time for various formulations.

FIGS. 2, 4 and 6 are graphs of total smoke release against time for various formulations.

Figure 7:
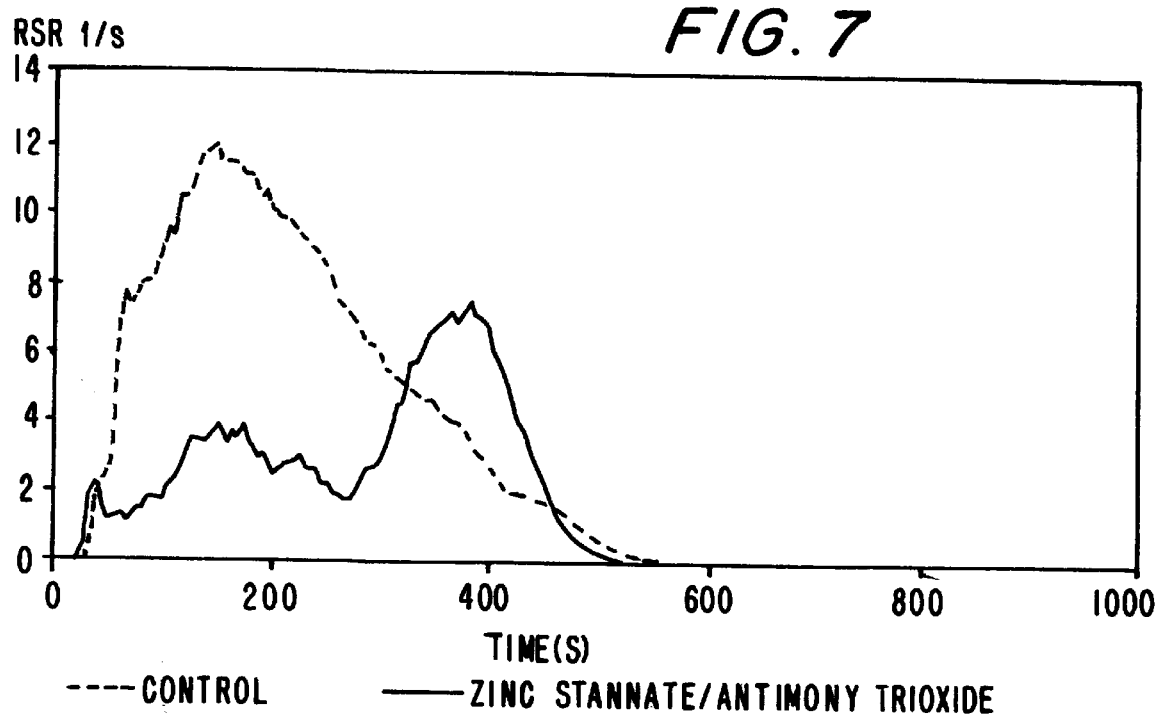
FIG. 7 is a graph of smoke release against time for two formulations.
Figure 8:
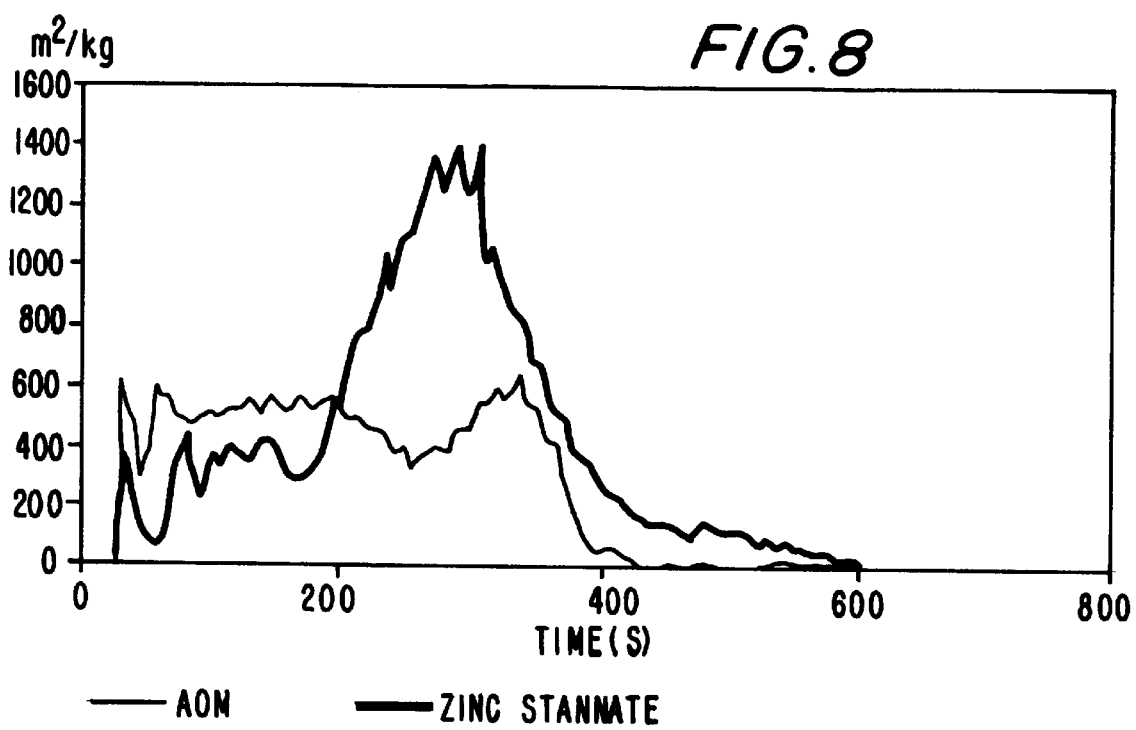
FIG. 8 is a graph of specific extinction area against time for two specific formulations.
Figure 9:
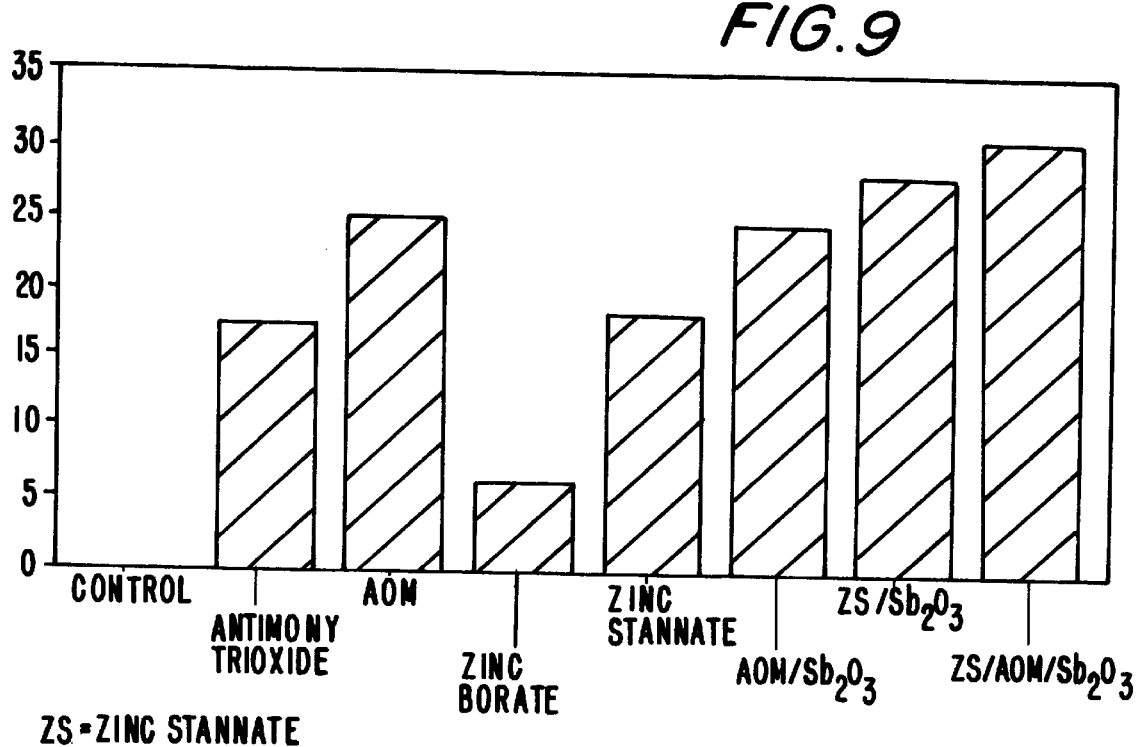
FIGS. 9, 10 and 11 are bar charts showing the effectiveness of various fire-resistant additives, respectively on smoke, rate of heat release (RHR) and overall.
Figure 10:
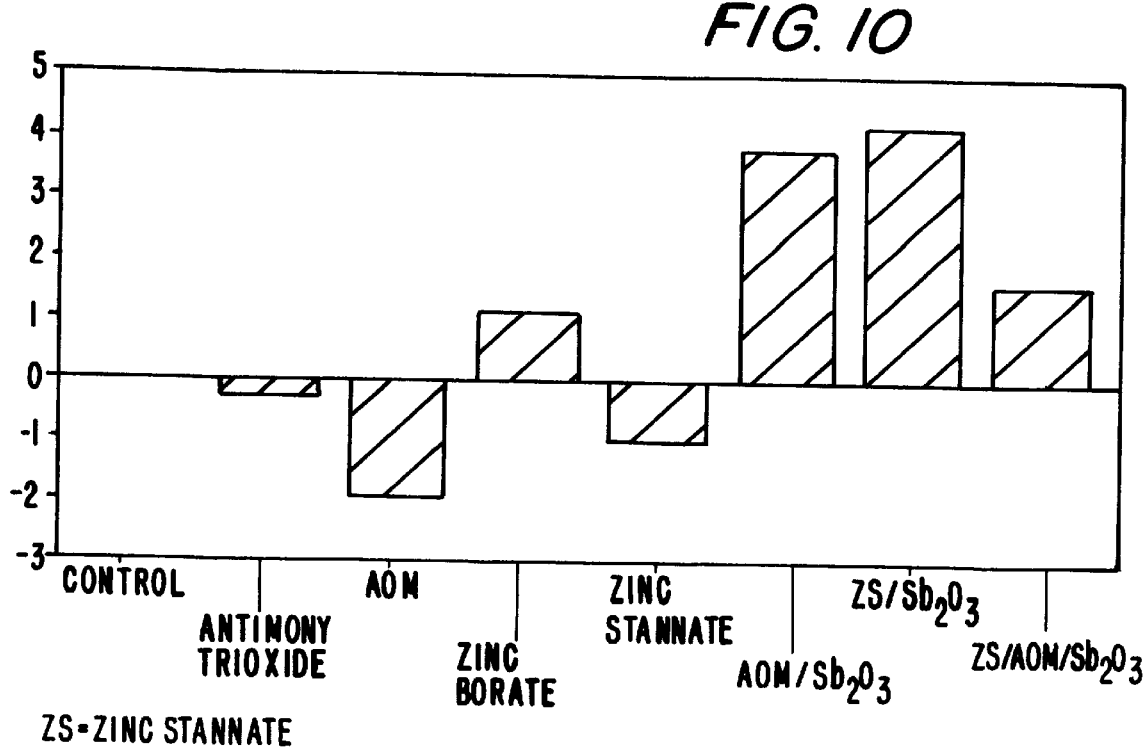
Figure 11:
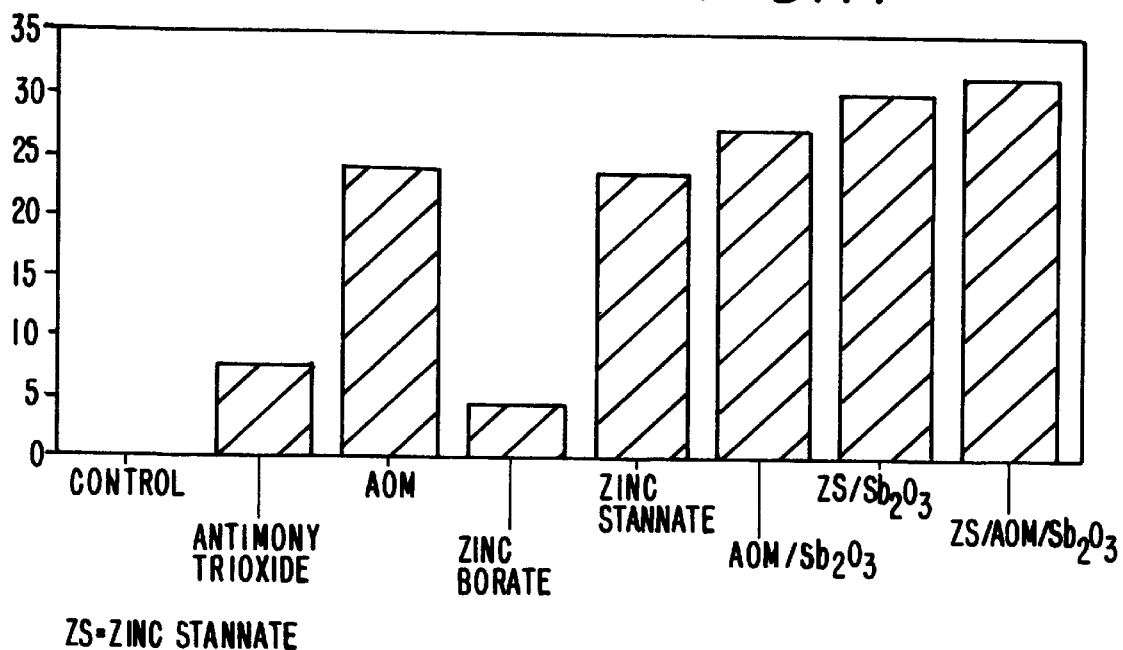
Figure 12:
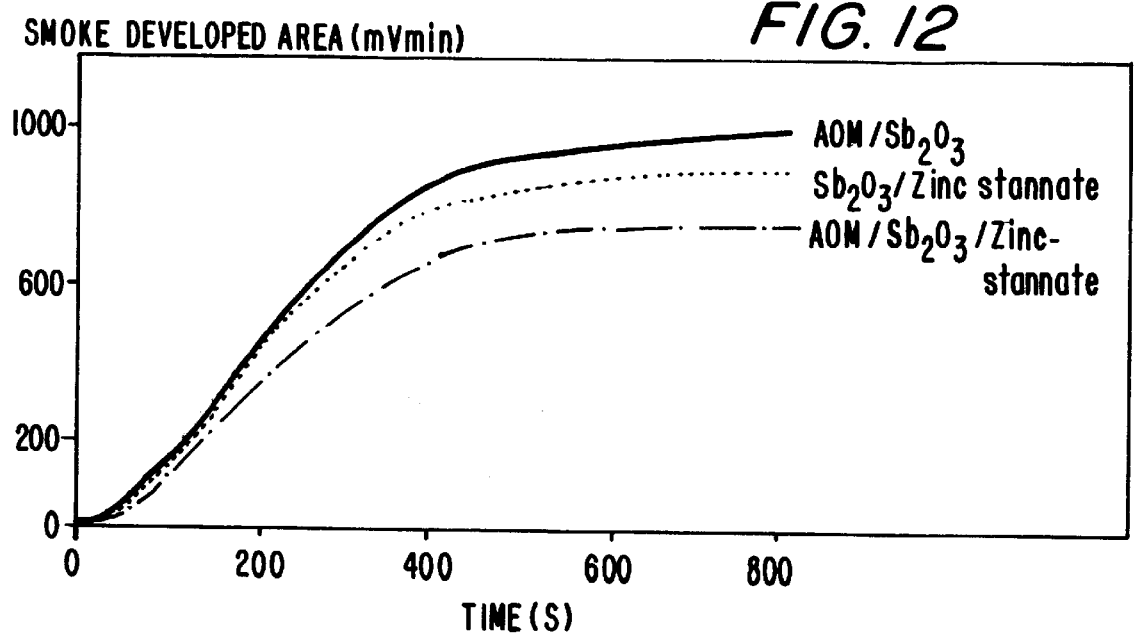
FIG. 12 is a graph of smoke obscuration in a Steiner tunnel for various formulations.

Fire performance was measured by cone calorimetry.

EXPERIMENTAL

A series of compounds was formulated using a laboratory two roll mill. Formulation details are given in Table 1. Plaques 100 mm×100 mm×3 mm were compression moulded at 150° C. for 3 minutes.

The control formulation is highly flame retarded with Cl, Br, P and a precipitated A aluminium trihydroxide with a nominal BET surface area of 4 $m^2g^{-1}$. All other formulations contain ten parts of test flame retardant per hundred of the PVC polymer.

TABLE 1

CONTROL FORMULATION

|  | GRADE | SUPPLIER | phr* |
|---|---|---|---|
| PVC | S706 | Hydro Polymers | 100 |
| Phosphate plasticiser | Santisizer 148 | Monsanto | 30 |
| Brominated aromatic ester | DP 45 | Great Lakes | 20 |
| A aluminium trihydroxide | SF4E | Alcan Chemicals Europe | 30 |
| Stabiliser | Irgastab EX 712 | Ciba | 7 |
| Process Aid | Stearic Acid | Merck | 0.5 |
| Process Aid | Irgawax 371 | Ciba | 0.5 |

*weight in parts per hundred of PVC

TABLE 2

TEST FLAME RETARDANTS

| | |
|---|---|
| Antimony Trioxide | Cookson |
| Ammonium Octamolybdate | Climax Molybdenum Co |
| Zinc Borate - Flamtard Z10 | Alcan Chemicals Europe |
| Zinc Stannate - Flamtard S | Alcan Chemicals Europe |

Cone calorimeter tests were carried out according to the procedure outlined in ASTM 1354 with edgeframe and grid. Results are an average of two burns.

One Component Systems (at 10 phr)

Graphs 1–4 show the effects of adding a single test flame retardant on total heat release and the total smoke release of the flexible PVC formulation. These systems are compared to the control.

Antimony Trioxide

Graphs 1 and 2 demonstrate the effects of adding 10 phr antimony trioxide as the sole test flame retardant. Total heat released is higher for the antimony trioxide system compared to the control. It has been found previously that antimony trioxide, when used in combination with other flame retardants and fillers can give a reduction in fire performance. It is well known that calcium carbonate is a very effective filler at absorbing hydrogen chloride and various free radical species[4]. Antimony requires these reactive intermediates in the gas phase in order for it to work as a flame retardant.

Antimony trioxide gave a reduction in smoke evolution compared to the control. This is not an expected finding for antimony trioxide but again emphasises that in a system filled with high levels of flame retardants there can be a range of interactions both synergistic and antagonistic.

Ammonium Octamolybdate

Ammonium octamolybdate (AOM) is sometimes used as a smoke suppressant in PVC. AOM works in the condensed phase interfering with the production of aromatics which are the constituents of smoke[5]. In these experiments AOM does not show any significant advantages on the heat released (Graph 1) compared to the control. Smoke suppression is clearly demonstrated in Graph 2.

Zinc Borate

Another additive which may be considered in a PVC formulation is zinc borate. The grade used here has the molecular formula of $2ZnO.3B_2O_3.3.5H_2O$ and is thermally stable up to 290° C. This grade has a surface area of 10 m$^2$ g$^{-1}$. Zinc species (zinc chloride or oxychloride) can catalyse the dehydrohalogenation reaction during PVC combustion and acts as a vapour phase flame retardant. There is also promotion of cross-linking reactions causing formation of a carbonaceous char. Boric oxide which is released is a low melting glass which acts to protect the underlying polymer [6].

At 10 phr loading the total heat released is not greatly affected (Graph 3) and smoke reduction is not dramatic (Graph 4).

Zinc Stannate

Graphs 3 and 4 show benefits in both total heat released and smoke on the addition of 10 phr zinc stannate. These benefits are attributed to the mechanism of flame retardancy of zinc stannate which works both in the vapour phase—as a flame inhibitor (similarly to antimony trioxide) and also shows condensed phase action to produce a cross-linked char (similarly to AOM)[7].

Two Component Additive Combinations

In order to pass certain fire tests many formulations will contain a number of flame retardants. Obviously it is advantageous if the flame retardants work in concert (synergy) rather than interfere with each other. Graphs 5 and 6 demonstrate the effect of adding a combination of test flame retardant on the total heat released and the total smoke released of the flexible PVC formulation and are compared to the control.

Antimony Trioxide/AOM (5 phr/5 phr)

Formulations containing a combination of antimony trioxide and AOM are mentioned in the literature[1,2,3]. This system gives the desired effect of reducing both heat released and smoke (Graphs 5 and 6).

Antimony Trioxide/Zinc Stannate (5 phr/5 phr)

A combination of zinc stannate and antimony trioxide gives almost identical performance on the total heat released to the AOM/antimony system (Graph 5), but has an added benefit of further reducing smoke (Graph 6), particularly in the early stages of combustion where the smoke production is distinctly suppressed. The curve shows a definite deflection in the gradient which suggests two stages of activity. This can be seen more clearly when looking at the rate of smoke released (Graph 7). Again the zinc stannate/antimony trioxide system shows significant smoke suppression at the early stages of combustion.

Further insight into this two stage activity can be gained by referring back to the single component systems. Graph 8 contrasts the smoke (specific extinction area (SEA) in units of m$^2$/kg) for AOM with the curve for zinc stannate. These gave the best single additive system performance as smoke suppressants. Both additives gave approximately the same total smoke output but AOM clearly gives relatively more smoke at the first stage whilst zinc stannate gave less smoke initially followed by more smoke later. These stages correspond to those in the typical burning of PVC.

Stage one involves dehydrochlorination leading to reactive conjugated polyenes and accounts for up to 60% of the mass loss for PVC. Stage two involves the formation of aromatics which may be competing with char formation. The production of aromatics accounts for about 10% of the mass loss for PVC[8].

Zinc stannate appears to be most effective at the dehydrochlorination stage whilst AOM is most effective during aromatisation. The mechanism by which AOM works as a smoke suppressant involves conversion of cis-polyenes into trans isomers leading to production of a cross linked carbonaceous char and light aliphatics. The result is a reduction in the production of aromatics hence less smoke is produced.

Other Pairings

Other combinations of flame retardants i.e.: zinc borate/antimony and Flamtard S/AOM also gave reduced heat release and smoke but were less effective smoke suppressants than the systems discussed above.

Three Component Additive Combination
Zinc Stannate/AOM/Antimony Trioxide (3.3 phr/3.3 phr/3.3 phr)

With four flame retardant additives there are a possible four combinations for a three component system. For initial studies a combination of zinc stannate, AOM and antimony trioxide has been evaluated. This system gave excellent fire performance and very low smoke.

Flame Retardant Effectiveness

The cone calorimeter is a valuable small scale test for assessing the performance of materials. In addition to heat release data obtained via oxygen depletion measurements it also provides a suitable test model for measuring other parameters such as time to ignition, smoke, carbon monoxide and carbon dioxide. At present much legislation and commercial material specification uses test methods of more limited scope.

Many researchers are working to demonstrate the correlations between these older test methods and cone calorimeter data[9]. For example, a researcher wishing to use cone calorimetry to screen candidate compounds for eventual testing to UL910 or IEC 1034 would probably be most interested in both heat release and smoke release.

Some workers feel that the compounded measurements such as the fire performance index (FPI) are useful. FPI is defined as the ratio of time to ignition and peak rate of heat release. The compounded measurements involving smoke include average smoke parameter (which is the product of average specific extinction area and peak rate of heat release) and average smoke factor (the average of the total smoke released multiplied by the peak rate of heat release). Table 3 lists some key results for the eight formulations discussed so far.

Tabulated data can be more manageable than a complete set of graphs (though inevitably some interesting aspects can be lost). Table 3 lists fourteen rows of properties where the best result in each row is printed in bold.

formulation. For ignition and burn time, it appears that most flame retardant additives did not significantly improve ignition time, apart from zinc stannate (when used alone). In fact most additives reduced ignition time. However, most systems gave a reduction in the burn time with the best performance from the sample containing AOM as the sole test flame retardant additive.

As discussed previously the parameters of key importance are heat release and smoke release. Table 3 shows that the system containing antimony trioxide gave the lowest average rate of heat release even though its total heat release was highest (Graph 1). The low average value is simply a function of the long burn time.

AOM did not perform best on any heat release parameter, but being primarily a smoke suppressant, it was not expected to. All other formulations gave good results on heat release properties.

The tertiary system containing zinc stannate, AOM and antimony trioxide did not perform the best for any heat release parameters but performed well on four of the smoke parameters i.e. SEA, total smoke release, peak rate of smoke release and smoke parameter. The binary system containing zinc stannate and antimony trioxide performed the best for the other smoke parameter i.e. average smoke factor.

Most systems gave a reduction in percent mass loss except where antimony trioxide was added on its own. This enhances the evidence that antimony trioxide only works in the vapour phase.

Effectiveness Per phr of Additive

By comparing a set of experimental samples with a control it is possible to normalise the tabulated data by taking each value as a percentage improvement versus the corresponding control (ensuring that improvements have a positive sign and poorer performance takes a negative value). Further normalisation can be carried out by dividing by the loading of the test material to give an index of effectiveness per phr of additive (though in this work the last stage is not essential because all samples were compared at 10 phr). The control (no test additive) thus becomes the baseline with an effectiveness index of zero for each parameter. The greater the positive index, the better the system performance.

TABLE 3

|  | Control | Antimony Trioxide | AOM | Zinc Borate | Zinc Stannate | AOM/ Antimony Trioxide | Zinc Stannate/ Antimony Trioxide | Zinc Stannate/ AOM/ Antimony Trioxide |
| --- | --- | --- | --- | --- | --- | --- | --- | --- |
| TTI (s) | 48 | 47 | 43 | 38.5 | 66.5 | 50.5 | 40 | 49 |
| Peak RHR (kW/m$^2$) | 131.6 | 134.3 | 126.6 | 128.4 | 157.8 | 118 | 121.3 | 128.4 |
| Time to Peak RHR(s) | 170 | 147.5 | 145 | 153 | 153 | 140 | 180 | 150 |
| Total HR (MJ/m$^2$) | 50 | 56 | 55 | 47 | 46 | 47 | 47 | 51 |
| Average RHR (kW/m$^2$) | 75.5 | 64 | 93.5 | 80 | 83 | 76 | 76.5 | 76.1 |
| SEA (m$^2$/kg) | 777 | 538 | 488 | 719 | 555 | 500 | 423 | 385 |
| TSR (-) | 2944 | 2315 | 1449 | 2485 | 1617 | 1725 | 1558 | 1383 |
| Peak RSR (l/s) | 12.2 | 8.2 | 7.1 | 10.7 | 7.8 | 6.7 | 7.9 | 6.6 |
| Smoke Parameter (MW/kg) | 102.3 | 72.3 | 61.8 | 92.3 | 87.6 | 59 | 51.3 | 50.7 |
| Average Smoke Factor (MW/m$^2$) | 278.2 | 234.6 | 115.9 | 214.2 | 158.3 | 131.3 | 92.3 | 110.8 |
| FPI (s m$^2$/kW) | 0.37 | 0.35 | 0.34 | 0.30 | 0.42 | 0.43 | 0.33 | 0.38 |
| Mass Loss (%) | 74.6 | 77.2 | 60.7 | 66.7 | 58.1 | 63.4 | 66.6 | 66.5 |
| CO Yield (kg/kg) | 0.10 | 0.15 | 0.08 | 0.09 | 0.12 | 0.13 | 0.09 | 0.12 |
| Burn Time (s) | 565 | 783 | 347 | 462 | 359 | 457 | 470 | 499 |

All formulations containing ten parts per hundred of a single flame retardant or combination performed the best in at least one parameter, with the exception of the control A key benefit of normalising the data in this way is that it is possible to conveniently group together (i.e. sum) the various parameters into a group value to provide the effectiveness for smoke, rate of heat release, time to ignition, mass loss, burn time and an overall summary of effectiveness. Table 4 details the parameters in each group and Table 5 shows the group effectiveness per phr of additive.

Graphs 9, 10 and 11 give a clear summary of which products performed best when taking all of the relevant parameters into account and demonstrate that a mixture of zinc stannate, AOM and antimony trioxide gives better heat release data, smoke performance and is best on overall effectiveness.

Large Scale Tests

From this data, the three best performers were selected for large scale Steiner Tunnel tests. The first compound selected was the binary system containing 5 phr AOM and 5 phr antimony trioxide. The second was the binary system containing 5 phr zinc stannate and 5 phr antimony trioxide. The third compound was the tertiary system containing 3.3 phr zinc stannate, 3.3 phr AOM and 3.3 phr antimony trioxide. Samples were compounded into sheets of 0.52 m×7.32 m and a thickness of 1.5 mm.

All samples were tested in accordance with ASTM-E84. All three compounds had virtually identical flame spread behaviour—flame spread index of 20 (Class A). The ASTM E84 smoke area gave the same trends as the cone calorimeter with the tertiary system performing best (Graph 12).

Conclusions

Zinc stannate when used on its own is a good flame retardant and smoke suppressant additive in this flexible PVC formulation, giving benefits in both total heat released and total smoke released. Zinc stannate is particularly effective at reducing smoke evolution in the dehydrochlorination stage of combustion. The flame retardancy and smoke suppressant properties are attributed to action in both the vapour phase and condensed phase—unlike antimony trioxide and ammonium octamolybdate.

A zinc stannate/antimony trioxide combination was surprisingly better than either component separately, and had particularly good effectiveness on smokes.

The tabulated calorimetry data and group effectiveness per phr of additive summaries indicate that a tertiary zinc stannate/AOM/antimony trioxide combination gave the best overall performance.

TABLE 4

Effectiveness per phr Additive - Parameters in each Group

| Parameter | Overall Effectiveness | Effectiveness on RHR | Effectiveness on Smoke | Effectiveness on Ignition | Effectiveness on Mass Loss | Effectiveness on Burn Time |
|---|---|---|---|---|---|---|
| Peak RHR (kW/m$^2$) | ✓ | ✓ | | | | |
| TTI (s) | ✓ | | | ✓ | | |
| Time to Peak RHR (s) | ✓ | | | | | ✓ |
| Average SEA (m$^2$/kg) | ✓ | | ✓ | | | |
| Total Heat Released (MJ/m$^2$) | ✓ | ✓ | | | | |
| Total Smoke Reteased (-) | ✓ | | ✓ | | | |
| Mass Loss (%) | ✓ | | | | ✓ | |
| FPI (s m$^2$/kW) | ✓ | | | ✓ | | |
| Average Smoke Parameter (MW/kg) | ✓ | | ✓ | | | |
| Average RHR (kW/m$^2$) | ✓ | ✓ | | | | |
| 3 min Average RHR (kW/m$^2$) | ✓ | ✓ | | | | |
| EHC (MJ/kg) | ✓ | ✓ | | | | |
| CO yield (kg/kg) | ✓ | | | | | |
| CO$_2$ yield (kg/kg) | ✓ | | | | | |
| Peak Rate of Smoke Released (l/s) | ✓ | | ✓ | | | |
| Average RSR (l/s) | ✓ | | ✓ | | | |
| Average Smoke Factor (MW/m$^2$) | ✓ | | ✓ | | | |
| Average Mass Loss Rage g/s) | ✓ | | | | ✓ | |
| Burn Time (s) | ✓ | | | | | ✓ |

TABLE 5

Group Effectiveness per phr of Addition

| | Control | Antimony Trioxide | AOM | Zinc Borate | Zinc Stannate | AOM/ Antimony Trioxide | Zinc Stannate/ Antimony Trioxide | Zinc Stannate/ AOM/ Antimony Trioxide |
|---|---|---|---|---|---|---|---|---|
| Effectiveness on RHR | 0 | −0.32 | −2.02 | 1.11 | −1.06 | 3.85 | 4.22 | 1.64 |
| Effectiveness on Smoke | 0 | 17.34 | 24.91 | 6.34 | 18.26 | 24.66 | 28.10 | 30.90 |
| Effectiveness on Ignition | 0 | −0.61 | −1.73 | −3.76 | 5.41 | 2.25 | −2.63 | 0.43 |
| Effectiveness on Mass Loss | 0 | 1.53 | −1.52 | −0.19 | 0.31 | 0.55 | −0.56 | 0.58 |
| Effectiveness on Burn Time | 0 | −5.19 | 2.38 | 0.80 | 2.62 | 0.14 | 2.26 | 0.001 |

TABLE 5-continued

Group Effectiveness per phr of Addition

|  | Control | Antimony Trioxide | AOM | Zinc Borate | Zinc Stannate | AOM/ Antimony Trioxide | Zinc Stannate/ Antimony Trioxide | Zinc Stannate/ AOM/ Antimony Trioxide |
|---|---|---|---|---|---|---|---|---|
| Overall Summary of Effectiveness | 0 | 7.67 | 24.15 | 4.36 | 23.59 | 27.38 | 30.30 | 31.87 |

REFERENCES

1. W. Coaker, The B. F. Goodrich Company, Flame and Smoke Retardant Cable Insulation and Jacketing Compositions. European Patent EP 0 364 717, Sep. 5, 1989.
2. P. W. Kroushl, Cooper Industries, Inc., Polyvinyl Chloride based Plenum Cable, U.S. Pat. No. 5,227,417, Jan. 24, 1992.
3. H. Naseem, Gary Chemical Corporation. Flame Retardant Low Smoke Poly(Vinyl Chloride) Thermoplastic Compositions. U.S. Pat. No. 4,892,683, May 20, 1988.
4. L. A. Chandler, M. M. Hirschler and G. F. Smith, Heated tube furnace test for the emission of acid gas from PVC wire coating materials, effect of experimental procedures and mechanistic considerations, *European Polymer Journal*, Vol 23, p 51–61, 1987.
5. L. L. Musselman, Mechanisms of Molybdenum Containing Flame/Smoke Suppressants, FRCA Conference Proceedings, Orlando, Fla., Mar. 29–Apr. 1, 1992, pp 1–3.
6. K. K. Shen, Boron-Containing Fire Retardants, FRCA Conference Proceedings, Orlando, Fla., Mar. 29–Apr. 1, 1992, pp 5–9.
7. P. A. Cusack, M. S. Heer and A. W. Monk. Zinc Hydroxystannate, A Combined Flame Retardant and Smoke Suppressant for Halogenated Polyesters. Polymer Degradation and Stability, 32, 1991.
8. M M Hirschler. Thermal Decomposition (STA and DSC) or PVC Compounds Under a Variety of Atmospheres and Heating Rates. *European Polymer Journal*, Vol 22 Part 2. 1986 pp 153,–160.
9 Heat Release in Fires. Ed Babrauskas and Gravson. Elsevier, 1992.

I claim:

1. A formulation comprising at least one polymer and at least one fire-resistant additive, halogen being present in the polymer and/or the additive, wherein there is present from 5 to 20 parts by weight, per hundred parts by weight of polymer, of a mixture of from 10–90 wt % of an antimony compound and from 90–10 wt % of a divalent metal stannate.

2. A formulation as claimed in claim 1, wherein the polymer is PVC.

3. A formulation as claimed in claim 2 which consists essentially of PVC together with 40–160 parts by weight of at least one fire-resistant additive, 3–15 parts by weight of at least one stabiliser, and 0.1–5 parts by weight of at least one process aid, all expressed as per hundred parts by weight of PVC.

4. A formulation as claimed in claim 3, wherein the fire resistant additive comprises 15–60 parts by weight of at least one phosphate plasticiser, 10–40 parts by weight of at least one halogenated plasticiser, 15–60 parts by weight of aluminium trihydroxide, and 5–20 parts by weight of the said mixture of an antimony compound and a divalent metal stannate, and 0–9 parts by weight of a molybdenum compound, all expressed as per hundred parts by weight of PVC.

5. A formulation as claimed in claim 4, wherein the molybdenum compound is ammonium octamolybdate.

6. A wire or cable comprising at least one core and a sheathing, wherein the sheathing is a PVC formulation according to claim 2.

7. Plenum cable comprising at least one current carrier surrounded by insulation which is surrounded by sheathing, wherein the sheathing is a PVC formulation according to claim 2.

8. A formulation as claimed in claim 1, wherein 1–20 parts by weight, per 100 parts by weight of polymer, of a molybdenum compound is present as a smoke suppressant.

9. A formulation as claimed in claim 5, wherein the formulation contains 1–9 parts by weight of the antimony compound, 1 to 9 parts by weight of the divalent metal stannate and 1 to 9 parts by weight of the molybdenum compound, all expressed as per 100 parts by weight of polymer.

10. A formulation as claimed in claim 8, wherein the molybdenum compound is ammonium octamolybdate.

11. A formulation as claimed in claim 1, wherein the antimony compound is antimony trioxide.

12. A formulation as claimed in claim 1, wherein the divalent metal stannate is zinc stannate.

* * * * *